No. 869,958. PATENTED NOV. 5, 1907.
F. BATEMAN & H. C. JONES.
PLANT SPRAYING MACHINE.
APPLICATION FILED MAY 8, 1905.

Witnesses:
Walter T. Pullinger
Titus H. Jones.

Inventors:
Frank Bateman.
Hilles C. Jones.
by their Attorneys
Howson & Howson

THE NORRIS PETERS CO., WASHINGTON, D. C.

UNITED STATES PATENT OFFICE.

FRANK BATEMAN, OF GRENLOCH, AND HILLES C. JONES, OF ALLENTOWN, NEW JERSEY, ASSIGNORS TO BATEMAN MANUFACTURING COMPANY, OF GRENLOCH, NEW JERSEY, A CORPORATION OF NEW JERSEY.

PLANT-SPRAYING MACHINE.

No. 869,958.     Specification of Letters Patent.     Patented Nov. 5, 1907.

Application filed May 8, 1905. Serial No. 259,375.

*To all whom it may concern:*

Be it known that we, FRANK BATEMAN, of Grenloch, Camden county, New Jersey, and HILLES C. JONES, of Allentown, Monmouth county, New Jersey, both citizens of the United States, have invented certain Improvements in Plant-Spraying Machines, of which the following is a specification.

Figure 1:
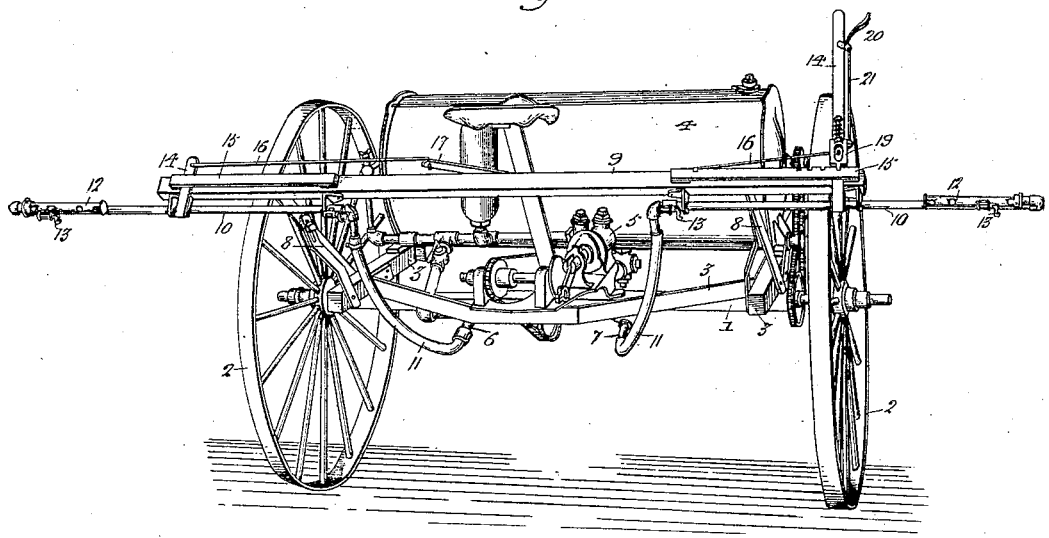
Figure 2:
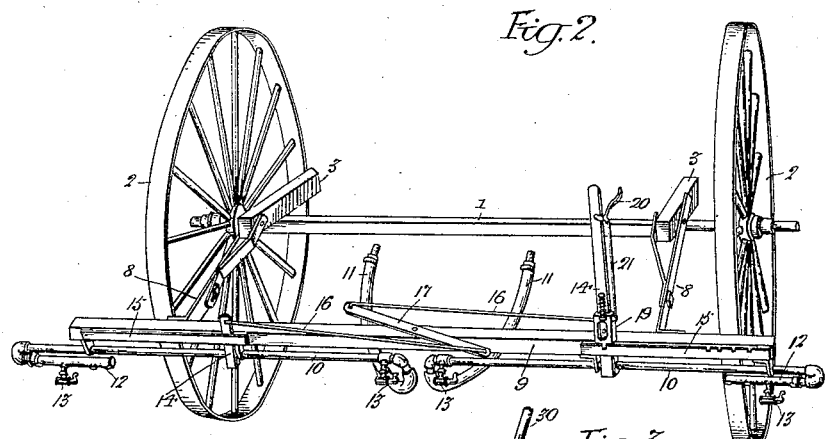
Figure 3:
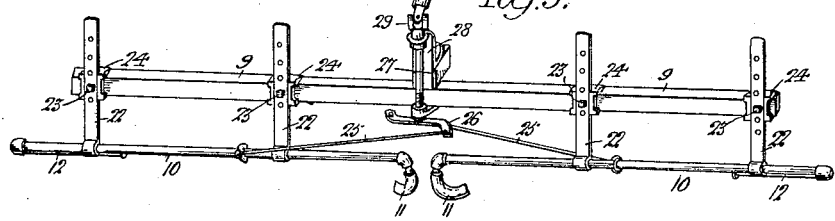
Figure 4:
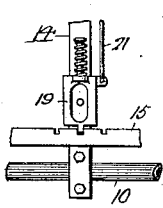

Our invention relates to that class of liquid spraying devices in which the liquid is delivered from perforated pipes mounted upon a wheeled frame, the object of our invention being to so construct such a spraying device as to readily control the width of the space over which the spray is being distributed; and the height from which the spray is being discharged upon the plants, and to provide for spraying a strip of greater width than the wheeled frame and yet permit of the passage of the machine through doorways, gateways, or other openings relatively contracted in width, as well as through openings of limited height. This object we attain in the manner hereinafter set forth, reference being had to the accompanying drawing, in which Figure 1, is a perspective view of a spraying machine constructed in accordance with our invention and showing the spraying devices elevated and expanded laterally; Fig. 2, is a similar view, but omitting the liquid reservoir and pumping devices, and showing the spraying devices contracted laterally, and also lowered; Fig. 3, is a perspective view illustrating a modification of the invention; and Fig. 4, is a face view, on an enlarged scale, of a certain locking device for the spray tubes shown in Fig. 1.

In Figs. 1 and 2 of the drawing, 1 represents an axle, having, at its opposite ends, wheels 2, this axle also carrying the bars 3 of a frame which supports the liquid reservoir 4, and the pumping mechanism 5, all of which are of a construction heretofore known and constituting no part of my present invention, hence no further reference to them here will be necessary except to say that the delivery pipe of the pumping mechanism has two nozzles 6 and 7, one for supplying a sprayer on one side of the machine and one for supplying a sprayer on the opposite side of the machine.

Hung to the frame 3 by means of pivoted arms 8 is a transverse bar 9, and in suitable hangers depending from this bar are free to slide laterally, a pair of spray pipes 10, one of which is connected, by a section of rubber tubing 11, to the nozzle 6, and the other, by a similar section of tubing 11, to the nozzle 7, each of these spray pipes having, at the outer end, a goose neck 12, and both pipe and goose neck being supplied with any desired number of spraying or distributing devices 13, of any appropriate construction. The transverse bar 9, Figs. 1 and 2, it is obvious, may be raised or lowered and retain any adjusted position by any suitable means, common in the prior art for this purpose, and it is not deemed necessary to be shown herein, or the said bar may be mounted as in Fig. 3, hereinafter more particularly described.

Each of the spray pipes 10 has an upwardly projecting arm 14, free to slide laterally in a guide 15 on the bar 9, and each of these arms is connected by a rod 16 to one arm of a lever 17, centrally pivoted on the bar 9, so that when either one of the spray pipes is moved laterally inward or outward on the bar, the same movement will be imparted to the other spray pipe.

In the present instance one of the arms 14 is extended upwardly so as to be within convenient reach of the attendant, and by means of this arm the spray pipe to which it is connected can be readily projected or retracted, the arm being provided with a spring locking bolt 19, controlled by a hand lever 20 and connecting rod 21 on the arm, and serving, by engagement with any desired one of a series of notches in the guide 15, to lock the spray pipes 10, either in the fully retracted position shown in Fig. 2, in the fully projected position shown in Fig. 1, or in any one of a series of intermediate positions.

When the spray pipes are fully projected, the machine is adapted for spraying rows of plants as widely separated as are likely to be found in practice, and when the spray pipes are fully retracted the instrument can readily pass through gateways, doorways, or other relatively contracted passages, such contraction in the width of the machine being effected without any corresponding increase in the height of the same, as in those machines in which the spray pipes are hinged so as to be thrown upwardly, hence the machine can also pass with readiness through a low doorway, or can be stored beneath a shed or other structure having a low roof.

In the modification of our invention, shown in Fig. 3, the spray pipes 10, are mounted so as to be free to slide in the lower ends of hangers 22, each of which has a series of openings, to any one of which may be adapted a bolt 23 whereby the hanger is secured to a block 24 on the bar 9, thus permitting various positions of vertical adjustment of the spray pipes. In this modification, also, the spray pipes are connected by rods 25 to a lever 26, which is carried by a vertical shaft 27, the latter being free to turn in bearings in a bracket 28 centrally secured to the bar 9, and being connected, by a universal joint 29, to a shaft 30 leading to the front of the machine, or to any other point where it is convenient of access to the attendant.

Having thus described our invention, we claim and desire to secure by Letters Patent:—

1. The combination in a spraying machine, of two relatively long, inflexible and longitudinally movable spray pipes of constant length, a supporting frame therefor, a lever, a link connecting one arm thereof with one pipe, an operating handle connected to the other pipe, and a second link connecting said lever to said handle, with means for supplying the pipes with spraying liquid in their different positions of adjustment, substantially as specified.

2. The combination in a spraying machine, of a pair of relatively long, inflexible spray pipes of constant length, a supporting frame therefor, means for effecting longitudinal movement of one of said spray pipes on said supporting frame, and connections between said spray pipe and the opposite pipe, whereby corresponding movement of the latter is effected, substantially as specified.

3. The combination in a spraying machine, of a wheeled frame, a frame pivotally mounted thereon and susceptible of being raised and lowered in respect thereto, a relatively long, inflexible spray pipe of constant length supported upon said swinging frame, and means for moving said pipe longitudinally relatively to the swinging frame, substantially as specified.

In testimony whereof, we have signed our names to this specification, in the presence of two subscribing witnesses.

FRANK BATEMAN.
HILLES C. JONES.

Witnesses:
HARRY SNYDER,
FRANK H. BELL.